United States Patent [19]
Tani et al.

[11] Patent Number: 5,475,665
[45] Date of Patent: Dec. 12, 1995

[54] OPTICAL INFORMATION WRITING AND READING APPARATUS HAVING TWO LIGHT SOURCES

[75] Inventors: Naoaki Tani; Mitsuo Oshiba, both of Hachioji, Japan

[73] Assignee: Olympus Optical Co., Ltd., Tokyo, Japan

[21] Appl. No.: 273,140

[22] Filed: Jul. 14, 1994

Related U.S. Application Data

[63] Continuation of Ser. No. 958,180, Oct. 8, 1992, abandoned.

[30] Foreign Application Priority Data

Oct. 8, 1991 [JP] Japan ................................... 3-260755
Jan. 23, 1992 [JP] Japan ................................... 4-010169

[51] Int. Cl.$^6$ ........................................... G11B 7/095
[52] U.S. Cl. .................... 369/44.38; 369/44.42; 369/44.140
[58] Field of Search .................... 369/44.38, 44.37, 369/54, 44.441, 44.42, 109, 111, 112, 118, 121; 335/454

[56] References Cited

U.S. PATENT DOCUMENTS

| | | | |
|---|---|---|---|
| 4,432,082 | 2/1984 | Hsieh et al. | 369/44.38 |
| 4,571,716 | 2/1986 | Szerlip | 369/44.38 |
| 4,577,301 | 3/1986 | Mathews et al. | 369/44.38 |
| 5,033,040 | 7/1991 | Fujita | 369/44.37 |
| 5,267,226 | 11/1993 | Matsuoka et al. | 369/44.37 |

FOREIGN PATENT DOCUMENTS

| | | | |
|---|---|---|---|
| 261830 | 3/1990 | Japan . | |
| 0227835 | 9/1990 | Japan | 369/44.37 |

*Primary Examiner*—Aristotelis Psitos
*Assistant Examiner*—Thang V. Tran
*Attorney, Agent, or Firm*—Stevens, Davis, Miller & Mosher

[57] ABSTRACT

An apparatus for writing and reading information on and from an optical card by projecting a writing light beam and at least two reading light beams onto the optical card includes a first semiconductor laser for emitting a writing laser beam, a second semiconductor laser for emitting a reading laser beam, a diffraction grating for diffracting the reading laser beam into multiple reading laser beams, and an objective lens for projecting the writing laser beam and the reading laser beams onto the optical card. A reading laser beam spot is formed on the optical card at a middle point between two reading laser beam spots. Images of the reading laser beam spots are received by first and second light receiving elements, respectively. By processing output signals from the first and second light receiving elements, it is possible to verify the recorded condition of pits immediately after recording in regardless of a direction in which the optical card is moved. It is also possible to check the condition of the information track immediately before the writing. In this manner, the writing operation can be performed at a high speed in a suitable and reliable manner.

10 Claims, 9 Drawing Sheets

FIG_1
PRIOR ART

FIG_2

PRIOR ART

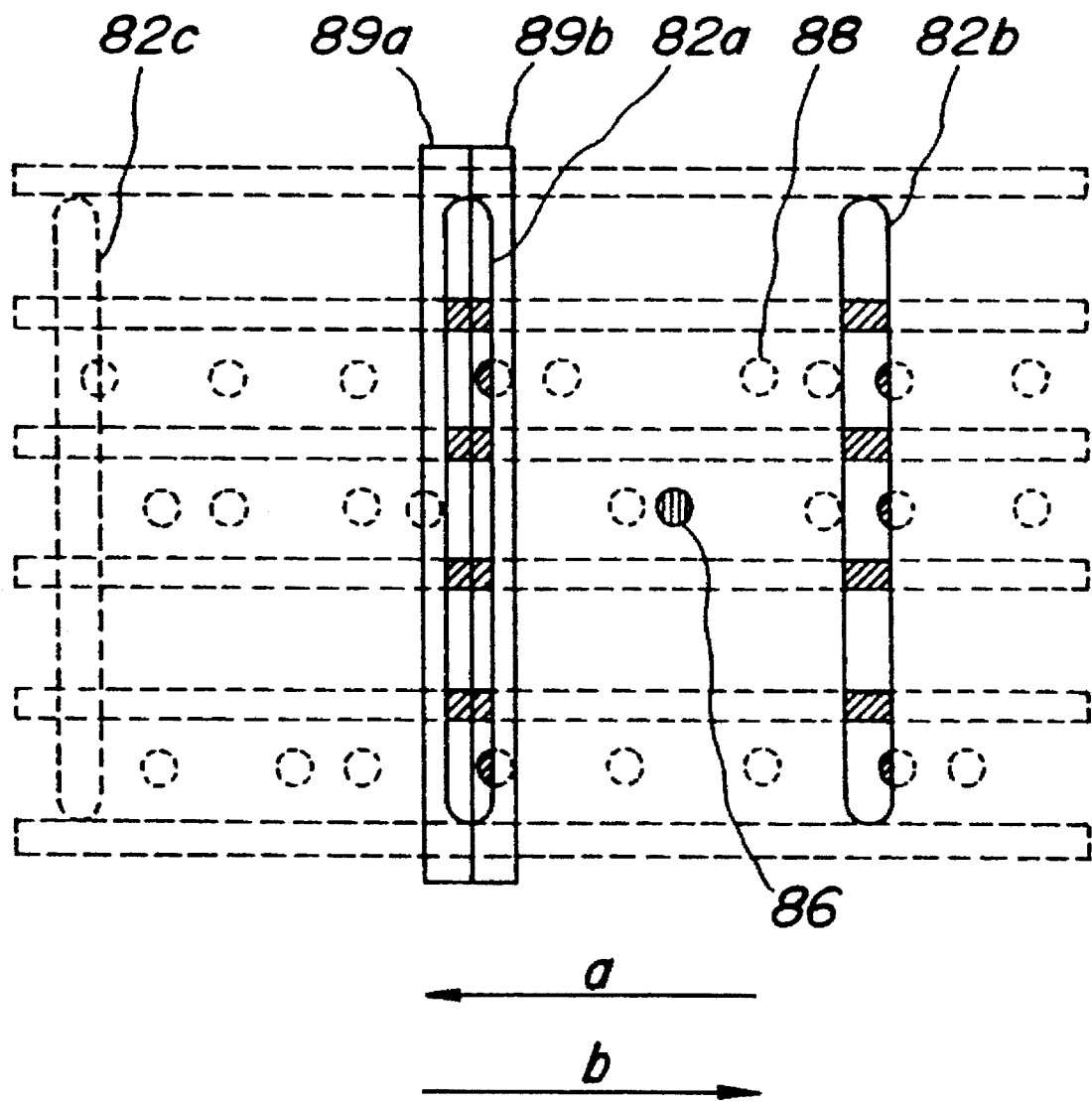

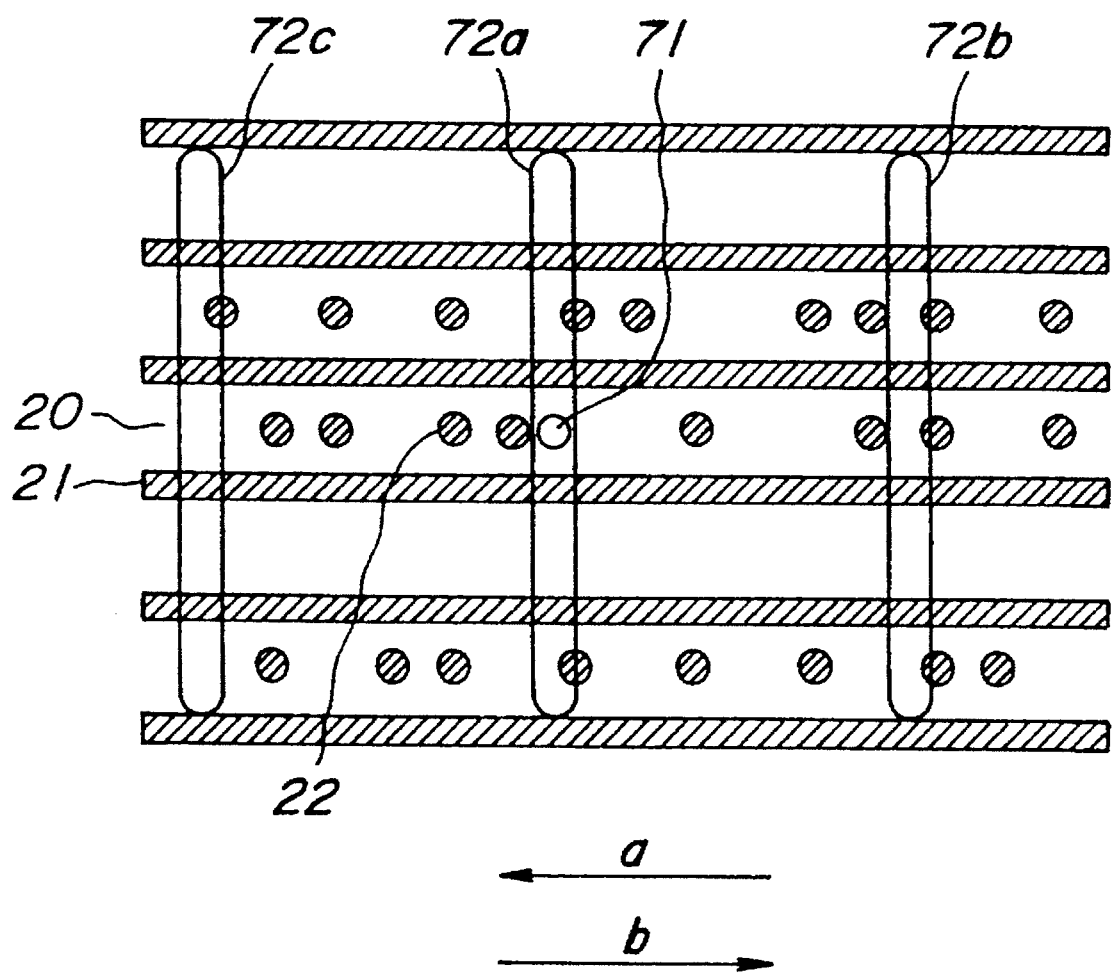
FIG_8

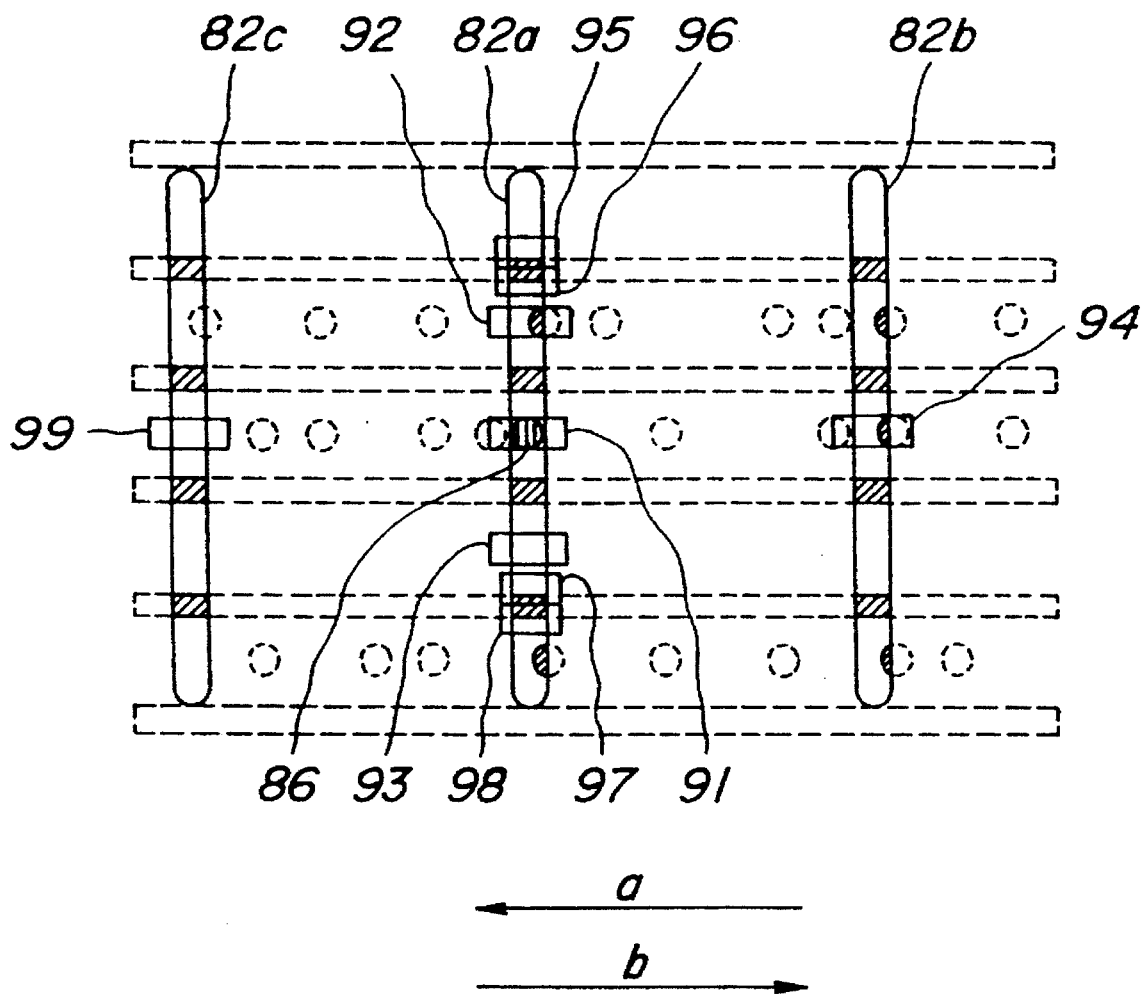

OPTICAL INFORMATION WRITING AND READING APPARATUS HAVING TWO LIGHT SOURCES

This application is a continuation of application Ser. No. 07/958,180, filed Oct. 8, 1992 now abandoned.

BACKGROUND OF THE INVENTION

1. Field of the Invention

The present invention relates generally to an apparatus for writing information on an optical record medium such as an optical card by projecting a writing light beam onto the optical record medium and for reading the information out of the optical record medium by projecting a reading light beam, and more particularly to an optical information writing and reading apparatus comprising a first light source for emitting a writing light beam and a second light source for emitting a reading light beam and projecting these light beams simultaneously onto the same information track in an optical record medium.

2. Related Art Statement

The above mentioned optical information writing and reading apparatus has been known and is described in Japanese Patent Laid-open Publication Kokai Sho No. 2-61830. In the known optical information writing and reading apparatus, there are provided a first light source for emitting a writing light beam and a second light source for emitting a reading light beam separately from each other and these writing and reading light beams are projected onto the same information track of an optical card to form writing light spot and reading light spot on the same information track at positions separated from each other in a track direction in which the information track extends, and therefore it is possible to check a pit recorded by the writing light spot immediately after the recording. Such a checking operation is called a verifying operation. In this manner, it is possible to verify the recorded condition while the information is written on the optical card by the writing light beam. In another known optical information writing and reading apparatus in which only a single light beam is used for writing the information on an optical card and reading the information out of the optical record medium, in order to effect the verifying operation it is necessary to scan the optical record medium twice, i.e. a first scan for writing the information on the optical card and a second scan for reading the information just written on the optical card. Therefore, in the optical information writing and reading apparatus having the two light sources, the verifying operation can be performed at a high speed as compared with the apparatus comprising only one light source. That is to say, the effective writing speed of the former apparatus can be twice of the writing speed of the latter apparatus. Moreover, in the apparatus having the two light sources, the reading light beam emitted by the second light source may be maintained constant, so that it can be used to detect focusing and tracking errors, and therefore the tracking and focusing servo control can be carried out stably during the writing operation.

FIG. 1 is a schematic view showing the construction of an optical head of the known optical information writing and reading apparatus shown in FIG. 14 of the above mentioned Japanese Patent Laid-open Publication. The optical head comprises a semiconductor laser 1 for emitting a writing laser beam. A writing laser beam emitted by the semiconductor laser 1 is converted by a collimator lens 2 into a parallel laser beam having a substantially elliptical cross section. This laser beam is then converted by a shaping prism 3 for effecting a reduction only in a direction parallel to a longitudinal axis of the elliptical laser beam into a substantially circular laser beam. A diameter of the circular laser beam is then limited by a circular stop 4 such that a laser light spot having a given diameter is projected onto an optical card. The laser beam is made incident upon a polarizing beam splitter 5. Since this laser beam is composed of substantially S polarized component due to characteristics of the semiconductor laser 1, a substantial part of the laser beam is reflected by a reflection surface of the beam splitter 5 and is made incident upon an objective lens 6 along its optical axis. The laser beam is converged by the objective lens 6 and is projected onto an optical card 7 as a circular laser spot. Then a portion of the optical card 7 is locally heated by the laser spot and its optical property is changed thermally in a non-reversible manner. In this manner, a pit is formed on the optical card 7.

The optical head further comprises a light emitting diode 8 of an end face emitting type having a slit-like light emitting surface. The light emitting diode 8 constitutes a reading light source and emits a reading light beam. A reading light beam emitted by the light emitting diode 8 is converted by a collimator lens 9 into a substantially parallel light beam and is then made incident upon the polarizing beam splitter 5. Only P polarized component of the incident light beam is transmitted through the reflection surface of the beam splitter 5 and is made incident upon the objective lens 6 at a portion which is deviated from the optical axis of the objective lens. A principal light ray of the reading light beam is inclined with respect to the optical axis of the objective lens 5 such that the reading light beam is projected onto the optical card 7 at a point which is shifted from a point at which the writing light beam is projected. In this manner, an image of the slit-like light emitting surface of the light emitting diode 8 is formed on the optical card 7.

FIG. 2 is a schematic view showing a positional relation between a writing light spot 23 formed on the optical card 7 by the writing laser beam emitted by the semiconductor laser 1 and a reading light spot 24 formed by the reading light beam emitted by the light emitting diode 8. On the optical card 7, there are formed a plurality of parallel guide tracks 21 along a longitudinal direction of optical card, and information tracks 20 are formed between the guide tracks. The optical card 7 and the light beam spots 23 and 24 are relatively moved in directions a and b which are parallel with a track direction in which the guide tracks and information tracks extend. Usually the optical card 7 is moved in the track direction to effect the information writing and reading.

When a pulse signal which is modulated in accordance with the information to be written on the optical card 7 is supplied to the semiconductor laser 1, the semiconductor laser emits a pulsatory modulated laser beam and pits 22 are successively recorded in an information track 20 on the optical card as illustrated in FIG. 2. A distance between the writing light spot 23 and the reading light spot 24 on the optical card 7 can be adjusted by changing the above mentioned inclination angle between the writing light beam and the reading light beam during the manufacturing and adjusting operation of the optical head.

The information reading light beam emitted by the light emitting diode 8 is modulated by the guide tracks 21 and pits 22 and is reflected by the optical card 7. A reflected light beam is made incident upon the objective lens 6 and is converted thereby into a substantially parallel light beam.

The parallel light beam is then made incident upon the polarizing beam splitter 5. Since this light beam is reflected by the optical card 7 in accordance with the reflection law, the reflected light beam is composed substantially of the P polarized component. Therefore, the light beam is transmitted through the reflection surface of the beam splitter 5. The light beam transmitted through the polarizing beam splitter 5 is reflected by a reflection mirror 14 and is then converged by a converging lens 15. A half of the light beam emanating from the converging lens 15 is transmitted through a half mirror 16 and is made incident upon a signal reproducing and tracking error detecting photodetector 17 and the remaining half is reflected by the half mirror and is made incident upon a focusing error detecting photodetector 18. As explained above the reading light beam is made incident upon the objective lens 6 at a point deviated from the optical axis, and thus the focusing error can be detected in accordance with the off-axis principle. This off-axis principle is shown in FIG. 8 of the above mentioned Japanese Patent Laid-open Publication. The focusing error detecting photodetector 18 comprises two light receiving elements arranged side by side in the track direction and a movement of an image of the reading light spot 24 projected on the optical card 7 due to the focusing error is detected to derive a focusing error signal.

FIG. 3 illustrates an image 23a of the writing laser beam spot 23 and an image 24a of the reading light beam spot 24, said images being formed on the first photodetector 17. The photodetector 17 comprises signal reproducing light receiving elements 32, 33 for receiving images of pits 22 on two adjacent information tracks and tracking error detecting light receiving elements 30, 31 for receiving an image of a track which situates between said two information tracks. It should be noted that the light receiving element 33 is arranged to detect the pits situating on the same information track on which the pit is written by the writing light beam. In FIG. 3, the reading light spot 24a is formed at a given position with respect to the light receiving elements 30 to 33 free from the tracking error. When there is a tracking error, an image of the guide track is deviated with respect to the tracking light receiving elements 30 and 31 in the direction perpendicular to the track direction so that the tracking error can be detected as a change in a difference between the light intensities received by these light receiving elements. That is to say, a tracking error signal can be produced by deriving a difference between output signals from the light receiving elements 30 and 31 by means of a differential amplifier. During the signal reading operation, only the light emitting diode 8 is energized and the pit information recorded in adjacent two information tracks can be simultaneously read out by the light receiving elements 32 and 33.

When the information signal is to be written on the optical card 7, both the semiconductor laser 1 and light emitting diode 8 are energized. When the optical card is moved in the direction a shown in FIG. 2, a pit 22 just formed by the writing beam spot 23 is moved toward the reading beam spot 24, so that when the relevant pit arrives at the position of the reading beam spot, there is produced a change in the amount of light received by the signal reading light receiving elements 33 of the first photodetector 17 to produce a reproduced signal. In this manner, when the optical card 7 is moved in the direction a, immediately after a pit has been written, its recorded condition can be verified by checking an output signal produced by the light receiving element 33 to perform the prompt verifying operation.

In the above explained known apparatus including the two light sources, when the optical card 7 is moved in the direction b, it is impossible to reproduce the pit information immediately after writing, because in this case the writing beam spot image 23a situates at an upstream position with respect to the reading light spot image 24a viewed in the moving direction b of the optical card.

SUMMARY OF THE INVENTION

The present invention has for its object to provide a novel and useful optical information writing and reading apparatus having a writing light source and a reading light source, in which the verifying operation can be performed immediately after writing in both directions of the movement of an optical record medium.

According to the invention, an apparatus for writing and reading information on and from an optical record medium comprises:

a first light emitting means for emitting a writing light beam;

a second light emitting means for emitting a reading light beam;

an optical system for producing at least first and second reading light beams from said reading light beam and projecting the writing light beam and first and second reading light beams onto the optical record medium such that a writing light spot formed on the optical record medium by the writing light beam is positioned between a first reading light spot formed on the optical record medium by the first reading light beam and a second reading light spot formed on the optical record medium by the second light beam, said first and second reading light spots being formed at least on the same information track on which said writing light spot is formed;

a first photoelectric converting means for receiving an image of the first light spot to produce a first reproduced signal; and a second photoelectric converting means for receiving an image of the second light spot to produce a second reproduced signal.

In a preferable embodiment of the optical information writing and reading apparatus according to the invention, said second light emitting means comprises a semiconductor laser for emitting a laser beam and said optical system comprises a diffraction grating for diffracting said laser beam into a plurality of beams, said first reading light beam being formed by a zero-order diffraction beam and said second light beam being formed by one of ±1-order diffraction beams. For instance, the writing light spot and first and second reading light spots are arranged such that the first-order reading light spot, writing light spot and zero-order reading light spot are aligned in this order viewed in the track direction on the same information track. When the optical record medium is moved in a first direction, the recorded pit can be immediately read out by the zero-order reading light spot and when the optical record medium is moved in a second direction opposite to the first direction, the recorded Wit can be immediately detected by the first-order reading light spot. In this manner, the verifying operation can be carried out both in the first and second directions immediately after recording. Further, prior to the writing the information by the writing light beam, the condition of an information track can be checked by the first-order and zero-order beams when the optical record medium is moved in the first and second directions, respectively. When the relevant information track of the optical record medium is detected to be abnormal due to dusts or stains, it is possible to write the information on another information track. Therefore, the information can be written on the optical record medium at a very high effective recording speed in a stable and reliable manner.

In another preferable embodiment of the optical information writing and reading apparatus according to the invention, said second light emitting means comprises a semiconductor laser for emitting a laser beam and a diffraction grating for diffracting said laser beam into a plurality of beams, said first and second reading light beams being formed by ±1-order diffraction beams and a zero-order diffraction beam being made incident upon the optical record medium at the same point at which the writing light beam is made incident upon the optical record medium. In this embodiment, the verifying operation can be performed by using the ±1-order diffraction beams immediately after the writing operation. Further, since the ±1-order diffraction beams have the same intensity, the verifying signals having the substantially same amplitude can be obtained by the first and second photoelectric converting means and the verifying operation can be stably and reliably.

BRIEF DESCRIPTION OF THE DRAWINGS

FIG. 7 is a schematic view showing the construction of the second photodetector;

FIG. 8 is a schematic view illustrating a beam spot pattern formed on the optical card in a second embodiment of the optical information writing and reading apparatus according to the invention; and FIG. 9 is a schematic view showing the construction of the first photodetector of the second embodiment.

DESCRIPTION OF THE PREFERRED EMBODIMENTS

Figure 1:
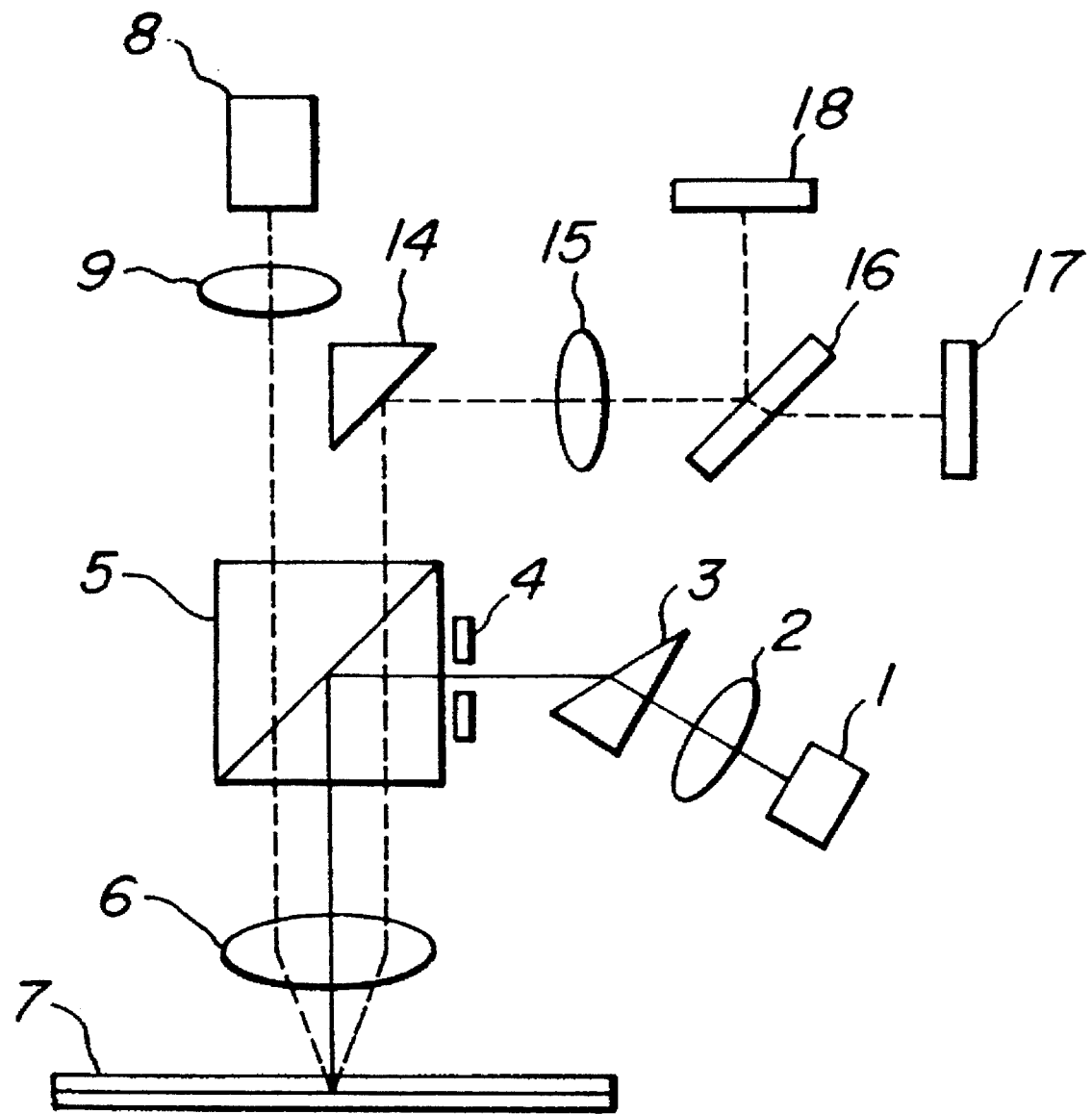
FIG. 1 is a schematic view showing the construction of a known optical information writing and reading apparatus having two light sources.
Figure 2:
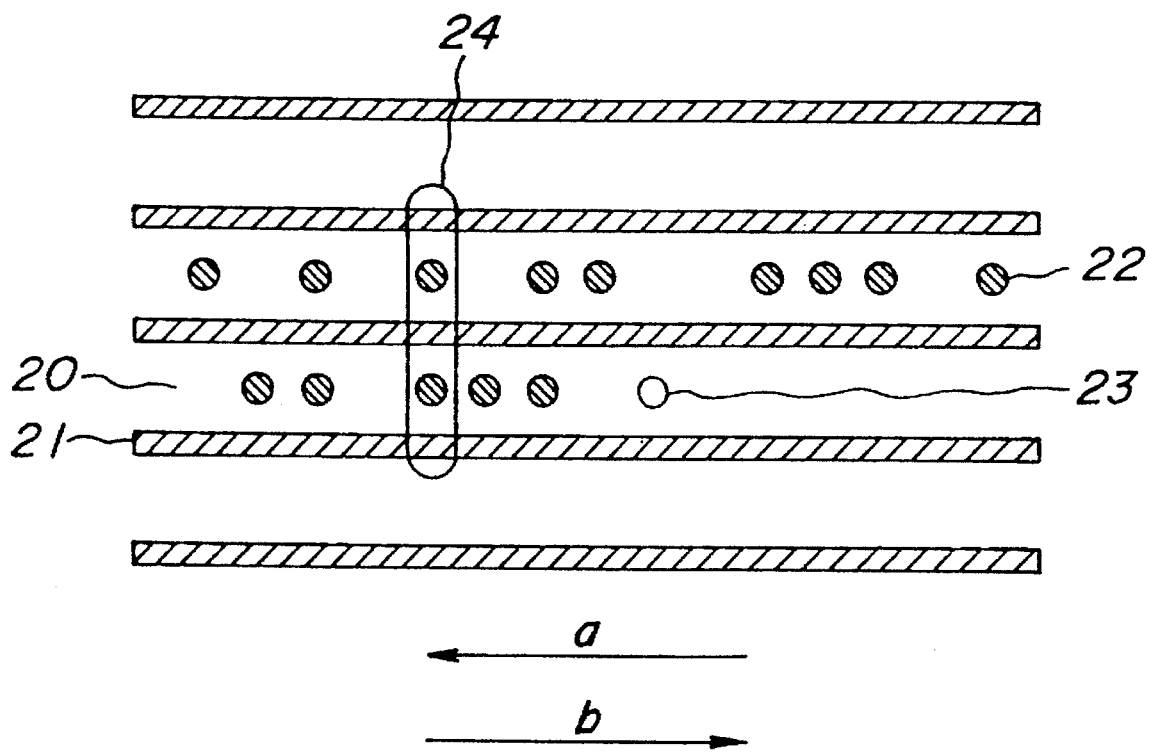
FIG. 2 is a schematic view illustrating beam spots formed on the optical card in the known apparatus shown in FIG. 1.
Figure 3:
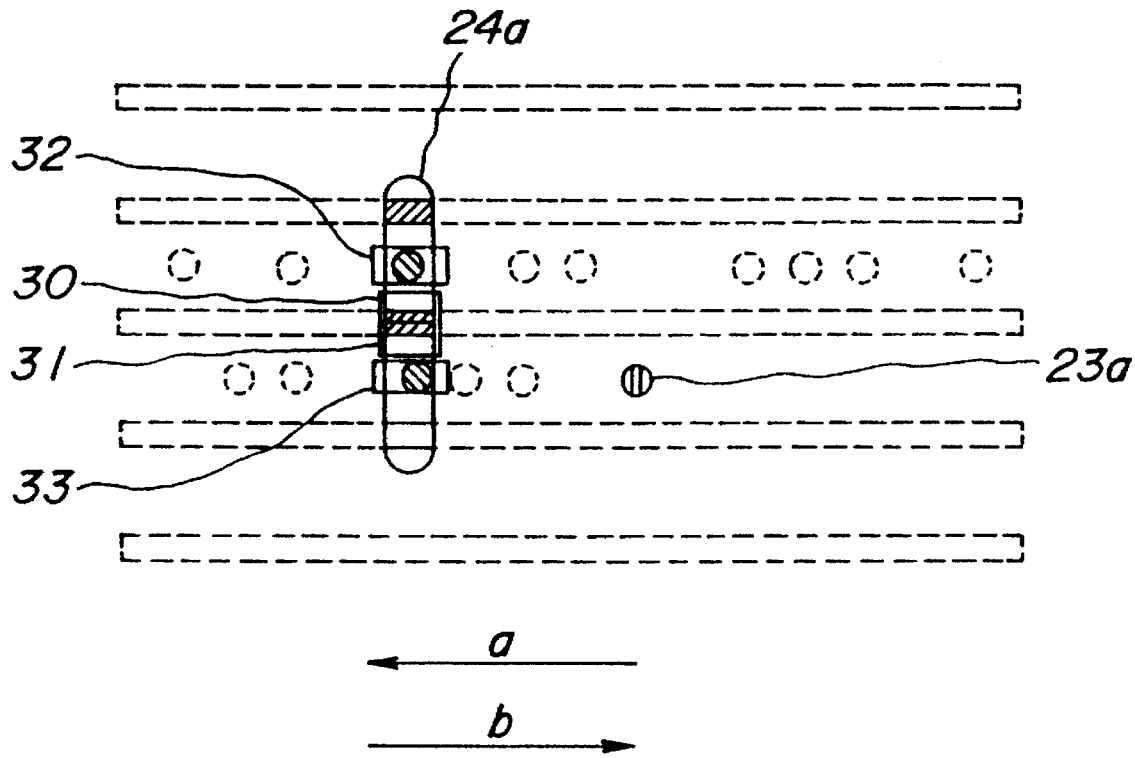
FIG. 3 is a schematic view depicting images of light spots formed on photodetectors of the known apparatus of FIG. 1.
Figure 4:
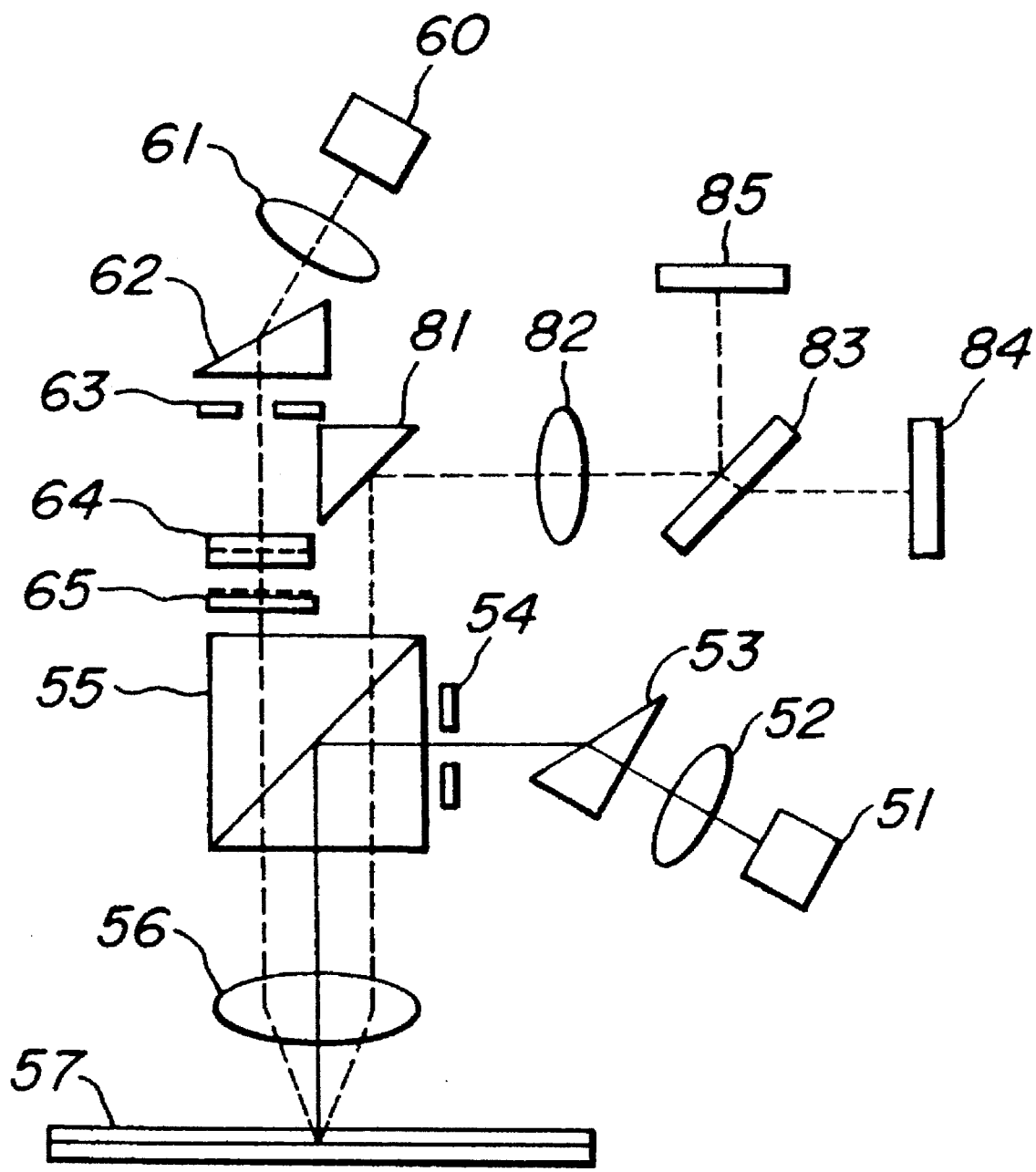
FIG. 4 is a schematic view illustrating the construction of an embodiment of the optical information writing and reading apparatus according to the invention.

FIG. 4 is a schematic view showing the construction of a first embodiment of the optical information writing and reading apparatus according to the invention. The construction of the optical system for projecting the writing light beam is same as that of the known apparatus shown in FIG. 1. That is to say, a laser beam emitted by a first semiconductor laser 51 is converted into a parallel laser beam by a collimator lens 52 and the cross sectional shape of the parallel laser beam is corrected into a circular shape by a shaping prism 53. Then the writing laser beam is made incident upon a polarizing beam splitter 55 via a stop 54 and is reflected by a reflection surface of the beam splitter. The laser beam reflected by the beam splitter 55 is then made incident upon an objective lens 56 and is focused thereby onto an optical card 57.

In the present embodiment, a reading light beam emitting means comprises a second semiconductor laser 60 for emitting a laser beam, a collimator lens 61 for converting the laser beam into a parallel laser beam, a shaping prism 62 for converting an elliptical cross section of the laser beam into a substantially circular cross section, a stop 63 for limiting a diameter of the substantially circular laser beam, a plano-concave lens 64 for diverging the laser beam in a direction perpendicular to a track direction in which the guide and information tracks extend, and a diffraction grating 65 for diffracting the laser beam emanating from the plano-concave lens 64 in a direction which in perpendicular to the diverging direction of the plano-concave lens. That is to say, ±1-order laser beams are separated in the track direction. The zero-order beam and ±1-order beams are made incident upon the polarizing beam splitter 55 and are transmitted therethrough, because the second laser 60 is constructed to emit the laser beam substantially composed of P polarized component. The zero-order and ±1-order laser beams emanating from the beam splitter 55 are made incident upon the objective lens 56 at positions which are deviated from the optical axis of the objective lens along which the writing laser beam is made incident upon the objective lens. Further principal axes of the zero-order and ±1-order laser beams are inclined with respect to the optical axis of the objective lens 56. In this manner, the zero-order and ±1-order laser beams are projected onto the optical card 57 as three separate light spots. Since these laser beams are expanded by the plano-concave lens 64 in the direction perpendicular to the track direction, the elongated light spots are formed on the optical card 57.

Figure 5:
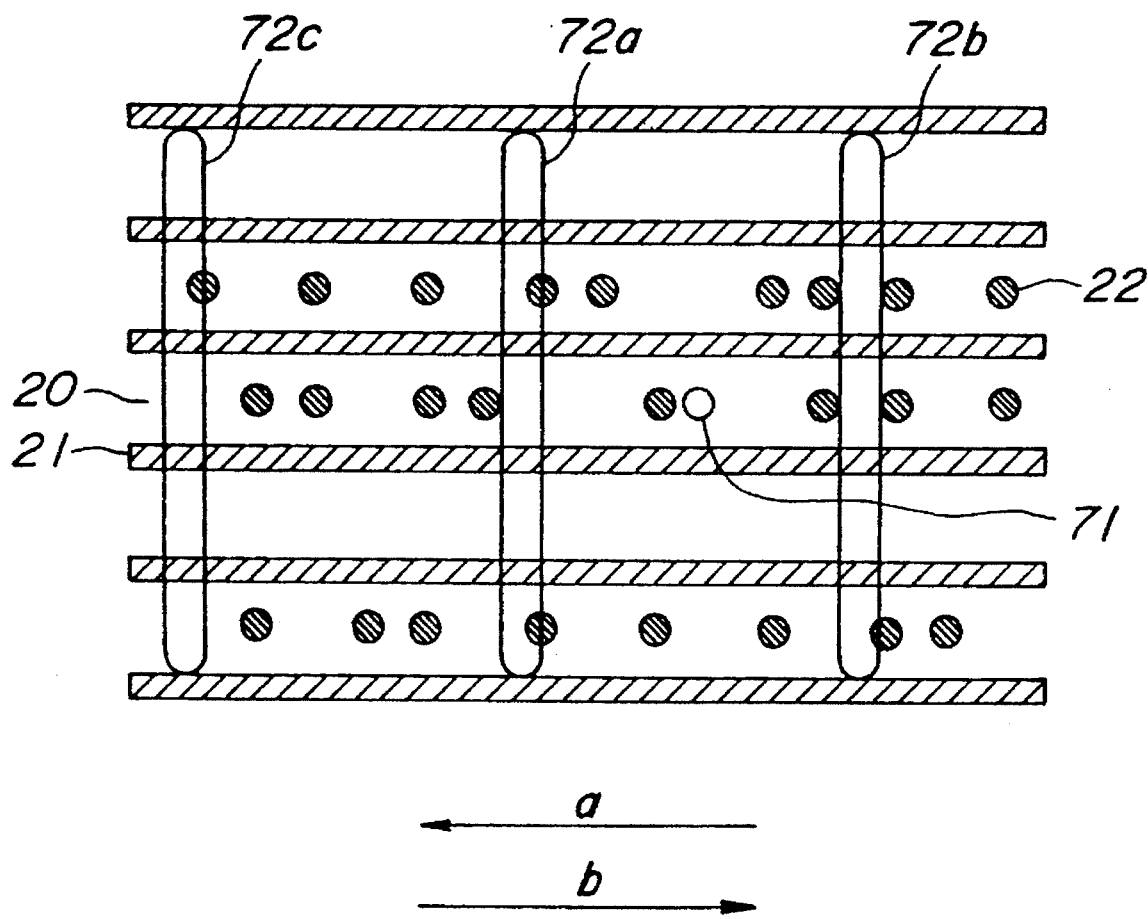
FIG. 5 is a schematic view showing a light spot pattern formed on the optical card in the apparatus shown in FIG. 4.

FIG. 5 is a schematic view showing the positional relationship between a writing beam spot 71 formed on the optical card 57 by the writing laser beam and three elongated reading light spots 72a, 72b and 72c formed on the optical card by the zero-order beam, ±1-order beam and −1-order beam, respectively. The inclination angles of the zero-order and ±1-order laser beams with respect to the writing laser beam are adjusted such that the writing beam spot 71 is positioned at a middle point between the zero-order beam spot 72a and the +1-order beam spot 72b. It should be noted that the writing beam spot 71 may be positioned at a middle point between the zero-order beam spot 72a and the −1-order beam spot 72c. The reading beam spots 72a to 72c are elongated in the direction perpendicular to the track direction such that they illuminate a plurality of information tracks 20 simultaneously, so that it is possible to read the information signals recorded on a plurality of information tracks simultaneously.

The reading light beams are modulated by the information pits 22 written on information tracks 20 in the optical card 57 and are reflected by the optical card in accordance with the reflection law. The reflected reading beams are transmitted through the polarizing beam splitter 55 via the objective lens 56 and then is reflected by a reflection prism 81. Then the reading light beams emanating from the reflection prism 81 are collected by a collecting lens 82 and are made incident upon a half mirror 83. The reading light beams transmitted through the half mirror 83 are made incident upon a first photodetector 84 for detecting a tracking error and a reproduced information signal and the reading light beams reflected by the half mirror are made incident upon a second photodetector 85 for deriving a focusing error.

Figure 6:
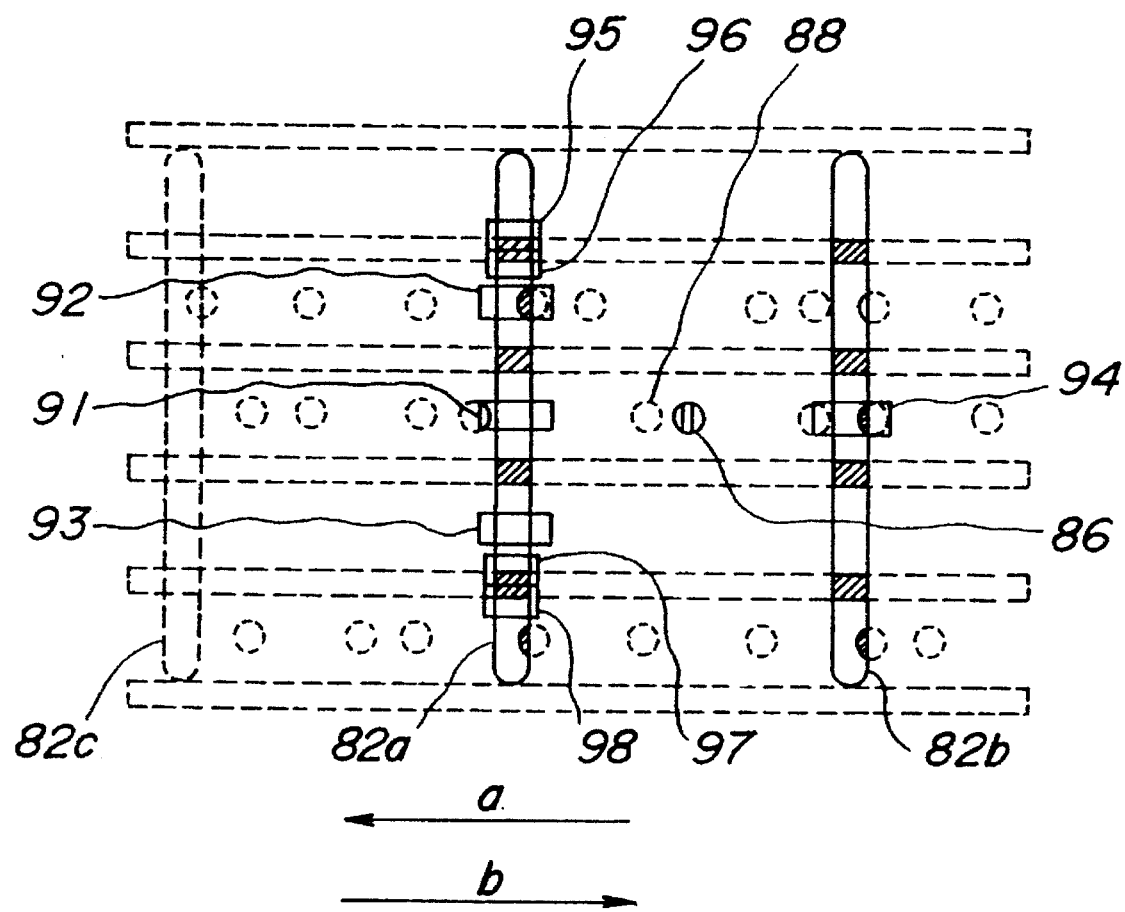
FIG. 6 is a schematic view depicting the construction of the first photodetector of the apparatus illustrated in FIG. 4.

FIG. 6 is a schematic view showing an image 86 of the writing laser beam spot 71 and slit-like images 87a, 87b and 87c of the reading laser beam spots 72a, 72b and 72c, respectively formed on the first photodetector 84. The first photodetector 84 comprises eight light receiving elements, i.e. first to fourth light receiving elements 91 to 94 for receiving images 88 of pits and fifth to eighth light receiving elements 95 and 98 for receiving images of guide tracks 21. It should be noted that the first and fourth light receiving elements 91 and 94 are arranged to receive the images of pits recorded on the same information track 20 onto which the writing laser beam spot 71 (FIG. 5) is projected. Further, the light receiving elements other than the fourth light receiving element 94 receive the images formed by the zero-order reading laser beam and only the fourth light receiving element receives the image formed by the +1-order reading laser beam. In the present embodiment, the −1-order reading laser beam is not used, so that in FIG. 6 the image of this laser beam spot is shown by a broken line.

When the tracking error occurs, the images of the guide tracks 21 formed on the light receiving elements 95, 96 and 97, 98 are deviated in the direction perpendicular to the track direction, so that by deriving a difference between output signals from the elements 95 and 96 and a difference between output signals from the elements 97 and 98, there are obtained two tracking error signals. For instance, the tracking servo control may be performed in accordance with a sum of these two tracking error signals. It should be noted that each of the paired light receiving elements 95, 96 and 97, 98 may be formed by a single light receiving element having two light receiving regions.

When the information is written on the optical card by the reading laser beam spot 71 while the optical card is moved in the first direction a, the image 86 of a pit just recorded by the writing laser beam is moved toward the zero-order laser beam spot 72a and thus the information is read out of the optical card by means of the first light receiving element 91 of the first photodetector 84. Therefore, by checking an output signal of the first light receiving element 91, the writing operation can be verified immediately after writing. When the optical card is moved in the second direction, the verifying operation can be similarly performed by checking an output signal of the fourth light receiving element 94.

In this manner, according to the invention, in regardless of the moving direction of the optical card with respect to the optical head, it is possible to reproduce a pit information immediately after the relevant pit is written by the reading light beam. Therefore, the verifying operation can be performed in the both moving directions of the optical card immediately after the pit has been recorded, so that the effective recording speed can be increased. Moreover, the condition of the information track 20 can be monitored immediately before the writing. That is to say, when the optical card 57 is moved in the first direction a, the condition of the information track 20 can be monitored by the output signal produced by the fourth light receiving element 94, and when the optical card is moved in the second direction b, the condition of the optical card can be checked by the output signal from the first light receiving element 91. As the result of this checking, when the relevant information track is detected to be already used or dusts or damages are existent on the information track, the writing operation may be stopped or may be carried out for another normal track which is not used.

FIG. 7 is a schematic view showing the construction of the second photodetector 85 for detecting the focusing error. The second photodetector 85 comprises first and second light receiving elements 89a and 89b which are separated in the track direction and are elongated in the direction perpendicular to the track direction such that the element 89a receives a half of the elongated image 82a of the zero-order reading beam and the element 89b receives a remaining half of the image 82a. When a focusing error occurs, the image 82a is moved in the track direction, so that by deriving a difference between output signals from these light receiving elements 89a and 89b, it is possible to detect the focusing error.

In the first embodiment so far explained, the writing beam spot 86 is positioned at a middle point between the zero-order reading beam spot 82a and the +1-order reading beam spot 82b. In general, an intensity of the zero-order beam is larger than that of the +1-order beam by about three times. Therefore, the amplitude of the output signal from the first light receiving element 91 is larger than that of the fourth light receiving element 94 by about three times. In order to effect the verifying operation stably and easily, it is necessary to make the amplification of an amplifier for amplifying the output signal from the fourth light receiving element 94 larger than that for the output signal from the first light receiving element 91 by about three times. However, in this case S/N of the output signal from the fourth light receiving element 94 might be decreased. Therefore, the information reproducing ability while the optical card is moved in the first direction might be different from that in the movement in the second direction and the verifying operation could not be performed stably.

FIGS. 8 and 9 are schematic views similar to the schematic views shown in FIGS. 5 and 6 illustrating the beam spot pattern and the relation between the images of the beam spots and the light receiving elements of the first photodetector in a second embodiment of the optical information writing and reading apparatus according to the invention, in which the verifying operation can be carried out equally both in the first and second directions of the movement of the optical card. In this embodiment, portions similar to those of the first embodiment are denoted by the same reference numerals as far as possible and a duplicated explanation is dispensed with. In the second embodiment, the construction of the optical head is same as that of the first embodiment except for that the angles between the principal light rays of the zero-order and ±1-order laser beams being made incident upon the objective lens and the optical axis of the objective lens are adjusted such that the writing beam spot 71 formed on the optical card by the writing laser beam is positioned in superimposition with the central reading spot 72a formed on the optical card by the zero-order reading laser beam as illustrated in FIG. 8. Therefore, the spots 72b and 72c are situated on respective sides of the writing beam spot 71 viewed in the track direction or the moving direction of the optical card.

As shown in FIG. 9, the images 82a, 82b and 82c of the zero-order, +1-order and −1-order reading beam spots 72a, 72b and 72c, respectively are formed on the first photodetector. In the present embodiment, the first photodetector comprises nine light receiving elements 91 to 99. The first to eighth light receiving elements 91 to 98 are same as those of the first embodiment and the ninth light receiving element 99 is arranged such that it receives images of pits written in the central track within the reading beam spot image 82c of the −1-order reading beam spot 72c. When the optical card is moved in the first direction a, recorded pit information can be read out by the ninth light receiving element 99 immediately after recording and when the optical card is moved in the second direction b, the recorded pit information can be immediately reproduced by the fourth light receiving element 94. It should be noted that the fourth and nine light receiving elements 94 and 99 receive the images 82b and 82c formed by the first-order reading laser beams having substantially same intensity, so that the output signals from these light receiving elements have substantially the same amplitude. Therefore, these output signals can be amplified by the same amplification, and thus signal to noise ratios of the amplified signals become equal to each other and the verifying operation can be always performed equally in regardless of the moving direction of the optical card. Furthermore, as explained above the intensity of the first-order beams is smaller than that of the zero-order beam by about three times so that the reading operation for verifying the recorded pit information becomes much severer than a normal or usual reading operation. However, this is not disadvantage, because in order to record the information reliably, the written pit has to be checked severely. Also in the present embodiment, the condition of the optical card can be checked prior to the actual recording in both the moving directions a and b. That is to say, when the optical card is moved in the first direction a, the condition of the information track in the optical card can be monitored by processing the output signal from the fourth light receiving element 94 and when the optical card is moved in the second direction b, this checking can be effected by processing the output signal from the ninth light receiving element 99.

Further in the present embodiment, during the recording operation the writing laser beam and the zero-order reading beam are made incident upon the optical card in superimposition with each other, and thus the intensity of the zero-order reading beam can be utilized for writing the information. Therefore, the intensity of the writing laser beam can be made smaller than that of the writing laser beam of the first embodiment. For instance, the intensity of the writing laser beam may be equal to or slightly larger than a modulating component.

The present invention is not limited to the embodiments explained above, but many modifications and alternations may be conceived by those skilled in the art within the scope of the invention. For instance, in the above embodiments, the second laser and diffraction grating are provided and the reading light beams are formed by the zero-order and first-order diffraction beams. However, according to the invention, two or three reading light beams may be produced by providing two or three different light sources such as light emitting diodes and semiconductor lasers. In case of using the semiconductor laser or lasers as the light source for emitting the reading light beams, the loss of the light intensity due to the polarizing beam splitter can be reduced as compared with a case in which the light emitting diodes are used for emitting the reading light beams.

In the above embodiments, the reading light beam spots are formed in the slit-like shape elongated in the direction perpendicular to the track direction, so that a plurality of information tracks are simultaneously read out. However, according to the invention, it is not always necessary to read out a plurality of information tracks simultaneously and only one information track may be reproduced at a time. In such a case, the plano-concave lens may be dispensed with.

Furthermore, in the above embodiments, the writing light beam is made incident upon the objective lens along its optical axis and the reading light beams are inclined with respect to the optical axis. However, in principle, both the writing light beam and the reading light beams may be inclined with respect to the optical axis of the objective lens. Even in such a case, the positional relationship between the writing beam spot and the reading light spots can be adjusted such that the writing beam spot situates at a middle point between the reading beam spots.

What is claimed is:

1. An apparatus for writing and reading information on and from an optical record medium comprising:

a first light emitting means for emitting a writing light beam;

a second light emitting means for emitting a reading light beam;

an optical system for producing, from said reading light beam, at least first and second reading light beams for reading information written on the optical record medium by the writing light beam and projecting the writing light beam and said first and second reading light beams onto the optical record medium such that a writing light spot formed on the optical record medium by the writing light beam is positioned between a first reading light spot formed on the optical record medium by the first reading light beam and a second reading light spot formed on the optical record medium by the second reading light beam;

a first photoelectric converting means for receiving an image of the first reading light spot to produce a first reproduced signal; and a second photoelectric converting means for receiving an image of the second reading light spot to produce a second reproduced signal;

said second light emitting means comprising means for diverging said reading light beam in such a direction that said first and second reading light spots are elongated in a direction perpendicular to a track direction of information tracks on said optical record medium to illuminate a plurality of said information tracks simultaneously.

2. An apparatus according to claim 1, wherein said second light emitting means comprises a semiconductor laser emitting a reading laser beam and said optical system comprises a diffraction grating for diffracting said laser beam into zero-order laser beam and ±1-order laser beams, said zero-order laser beam is used as said first reading light beam and at least one of said ±1-order laser beams is used as said second reading light beams, and principal light rays of the zero-order laser beam and at least one of the ±1-order laser beams are inclined with respect to a principal light ray of the writing light beam such that the writing light spot is formed at a middle point between the first reading light spot formed by the zero-order laser beam and the second reading light spot formed by said one of the ±1-order laser beams.

3. An apparatus according to claim 2, wherein said first light emitting means comprises a semiconductor laser for emitting a writing laser beam which is made incident upon the objective lens along an optical axis thereof and said principal light rays of the zero-order laser beam and at least one of the ±1-order laser beams are inclined with respect to the optical axis of the objective lens.

4. An apparatus according to claim 1, wherein said means for diverging comprises a plano-concave lens.

5. An apparatus according to claim 1, further comprising a third photoelectric converting means including a pair of elongated light receiving elements arranged side by side in the track direction for receiving one of the first and second elongated reading light spots to derive a focusing error and a fourth photoelectric converting means having at least one pair of light receiving elements arranged side by side in the direction perpendicular to the track direction for receiving at least one image of a guide track contained in at least one of the first and second reading light spots to derive a tracking error signal.

6. An apparatus according to claim 1, wherein said second light emitting means comprises a semiconductor laser emitting a reading laser beam and said optical system comprises a diffraction grating for diffracting said laser beam into zero-order laser beam and ±1-order laser beams, said ±1-order laser beams are used as said first and second reading light beams, and principal light rays of the zero-order laser beam and ±1-order laser beams are inclined with respect to a principal light ray of the writing light beam such that the writing light spot is formed at a middle point between the first reading light spot formed by the +1-order laser beam and the second reading light spot formed by said one of the −1-order laser beam, said zero-order laser beam forming a third reading light spot in superimposition with said writing light spot.

7. An apparatus according to claim 6, wherein said first light emitting means comprises a semiconductor laser for emitting a writing laser beam which is made incident upon the objective lens along an optical axis thereof and said principal light rays of the zero-order laser beam and ±1-order laser beams are inclined with respect to the optical axis of the objective lens.

8. An apparatus according to claim 7, wherein said means for diverging diverges the reading light beam in such a direction that said first, second and third reading light spots are elongated in said direction perpendicular to the track direction to illuminate said plurality of information tracks simultaneously.

9. An apparatus according to claim 8, further comprising a third photoelectric converting means including a pair of elongated light receiving elements arranged side by side in the track direction for receiving one of the elongated first, second and third reading light spots to derive a focusing error and a fourth photoelectric converting means having at least one pair of light receiving elements arranged side by side in the direction perpendicular to the track direction for receiving at least one image of a guide track contained in at least one of the first, second and third reading light spots to derive a tracking error signal.

10. An apparatus according to claim 8, wherein said means for diverging comprises a plano-concave lens.

* * * * *